US009680316B2

(12) United States Patent
Rakoczy et al.

(10) Patent No.: US 9,680,316 B2
(45) Date of Patent: Jun. 13, 2017

(54) WIRELESS CHARGING SYSTEM

(71) Applicant: Almos Technologies Pty. Ltd., Fremantle, Western Australia (AU)

(72) Inventors: Steve Rakoczy, Perth (AU); Steven Thomas McGuinness, Perth (AU)

(73) Assignee: Almos Technologies Pty. Ltd., Fremantle (AU)

( * ) Notice: Subject to any disclaimer, the term of this patent is extended or adjusted under 35 U.S.C. 154(b) by 110 days.

(21) Appl. No.: 14/646,873

(22) PCT Filed: Nov. 27, 2013

(86) PCT No.: PCT/EP2013/074804
§ 371 (c)(1),
(2) Date: May 22, 2015

(87) PCT Pub. No.: WO2014/083027
PCT Pub. Date: Jun. 5, 2014

(65) Prior Publication Data
US 2015/0318731 A1    Nov. 5, 2015

(30) Foreign Application Priority Data
Nov. 29, 2012  (EP) .................................... 12194741

(51) Int. Cl.
*H02J 7/00*     (2006.01)
*H02J 7/02*     (2016.01)

(52) U.S. Cl.
CPC .......... *H02J 7/0027* (2013.01); *H02J 7/0044* (2013.01); *H02J 7/025* (2013.01)

(58) Field of Classification Search
CPC .................................................. H02J 7/0044

USPC ......................................................... 320/108
See application file for complete search history.

(56) References Cited

U.S. PATENT DOCUMENTS

| | | | |
|---|---|---|---|
| 2006/0262525 A1* | 11/2006 | Barbeau ................... | F21L 2/00 362/157 |
| 2008/0288357 A1* | 11/2008 | Stambaugh ............ | G06Q 10/06 705/15 |
| 2009/0224723 A1* | 9/2009 | Tanabe .................... | H02J 7/025 320/108 |

FOREIGN PATENT DOCUMENTS

WO    WO-2012095850    7/2012

* cited by examiner

*Primary Examiner* — Suresh Memula
(74) *Attorney, Agent, or Firm* — Marcus C. Dawes; Daniel L. Dawes

(57) ABSTRACT

A system comprising a plurality of electronic devices, each comprising a device housing and a rechargeable battery, and a charger comprising a charger housing and arranged for charging said rechargeable batteries, wherein said charger comprises at least one, preferably a plurality of wireless power transmitting coils in said housing and said electronic devices each comprise a wireless power receiving coil in said housing, wherein said power transmitting coils are arranged in an array along an axis, and wherein said charger housing and said device housings are formed such that the power receiving coils of said electronic devices can be placed and held in an array along said axis by placing said electronic devices in an array against each other, such that each power receiving coil has a corresponding power transmitting coil in its vicinity.

9 Claims, 4 Drawing Sheets

WIRELESS CHARGING SYSTEM

The invention relates to systems comprising electronic devices, each comprising a device housing and a rechargeable battery, and chargers comprising a charger housing and arranged for charging said rechargeable batteries, wherein said chargers each comprise a wireless power transmitting coil in said housing and said electronic devices each comprise a wireless power receiving coil in said housing. In particular the invention relates to systems for charging table number devices.

In restaurants or cafés having a central counter where clients order and/or pay for meals or drinks, the clients are given a pod or the like displaying a number and choose a table to wait for their order to be served to them. Such a pod or the like is commonly called a "table number". The pod is placed on the chosen table, visible for the waiters. When the order is ready to be served, the waiter reads the order number on the printed slip and searches the restaurant or café for the table with the corresponding pod on it, and serves the order to the client. A more appropriate name for the "table number" would be "order number", but in this document we will follow the usual terminology of the industry.

In large restaurants or cafés this raises the problem that it takes waiters a relatively long period of time to find the right table number. Therefore it would be advantageous to use electronic tracking of the table numbers. Such a solution, based on RFID (Radio Frequency Identification) technique is described in US 2008/0288357 A1, whereby each table has an RFID tag and the table number device incorporates an RFID reader. Another such system is described in applicant's own European patent application no. 12184294.

Because the table number devices need to be charged, there is a need for an efficient charging system. Wireless charging is a particularly advantageous solution, as it eliminates the need for connectors that could become damaged in a restaurant environment. Wireless charging systems exist, which comprise a "charging mat" on which electronic rechargeable devices can be placed to be charged. Such mat based chargers would take up a large area at the service counter.

The invention aims at a wireless charging system, which is in particular efficient to use with a plurality of substantially identical rechargeable electronic devices, such as table number devices.

According to the invention the system comprises a plurality of electronic devices each comprising a device housing and a rechargeable battery, and a charger comprising a charger housing and arranged for charging said rechargeable batteries, wherein said charger comprises at least one wireless power transmitting coil in said housing and said electronic devices each comprise a wireless power receiving coil in said housing, wherein said at least one power transmitting coil is arranged along an axis, and wherein said charger housing and said device housings are formed such that the power receiving coils of said electronic devices can be placed and held in an array along said axis by placing said electronic devices in an array against each other, such that each power receiving coil has one of said at least one power transmitting coil in its vicinity. Preferably said charger comprises a multitude of said wireless power transmitting coils arranged in an array along said axis, such that each power receiving coil has a corresponding one of said power transmitting coils in its vicinity. The shapes of the charger and the devices are thus designed to stack and hold the devices in a stable manner in said array.

Each electronic device preferably has a height which is substantially smaller than its depth and width, and said at least one power transmitting coil and said power receiving coil are arranged their respective housings such, that the maximum amount of power is transmitted if said electronic devices are arranged in said array with their height direction in the same direction as said axis. Said axis with said at least one power transmitting coil preferably extends from a base member of said charger housing, preferably in vertical direction, such that said multitude of electronic devices can be placed in a stack along said axis, such that only the first electronic device of said stack touches the base member. The charger housing preferably comprises an elongate member extending around said axis and comprising said at least one power transmitting coil, and said device housings each comprise a central through hole which allows said device housings to be placed around said elongate member. Said elongate member and said through holes are preferably cylindrical. Said electronic devices are preferably generally doughnut shaped. Compared to a wireless charging mat the coupling between the transmitting coil and the receiving coil in the system of the invention is more efficient as the receiver is perfectly located by the through hole, and the coupling is more efficient as the receiver antenna is arranged around the through hole, which surrounds the transmitting coil in the in the cylinder. Also a large number of items can be charged in a small space as they are stacked up.

Said charger is preferably provided with detection means arranged to detect the number of electronic devices present, and with charging control means arranged to power the power transmitting coils corresponding to said detected number. Said detection means preferably comprise an RFID tag reader in said charger housing and RFID tags on or in said device housing. Said detection means further preferably comprise an RFID tag reader in each of said device housings and wireless communication means for communicating RFID tag information to said charger. Stray electromagnetic field can be eliminated by activating only the transmitting coils where there is a receiving coil.

The invention also relates to an electronic device comprising a device housing a rechargeable battery, and a wireless power receiving coil in said housing, arranged to be used in a system with a wireless charger as described before. Furthermore the invention relates to a charger comprising a charger housing and arranged for charging rechargeable batteries in electronic devices, wherein said charger comprises at least one wireless power transmitting coil in said housing, wherein said at least one power transmitting coil is arranged along an axis, and wherein said charger housing is formed such that the power receiving coils of said electronic devices can be placed and held in an array along said axis by placing said electronic devices in an array against each other, such that each power receiving coil has one of said at least one power transmitting coil in its vicinity.

The invention will now be exemplified by means of a preferred embodiment, with reference to the figures, wherein.

Figure 1:
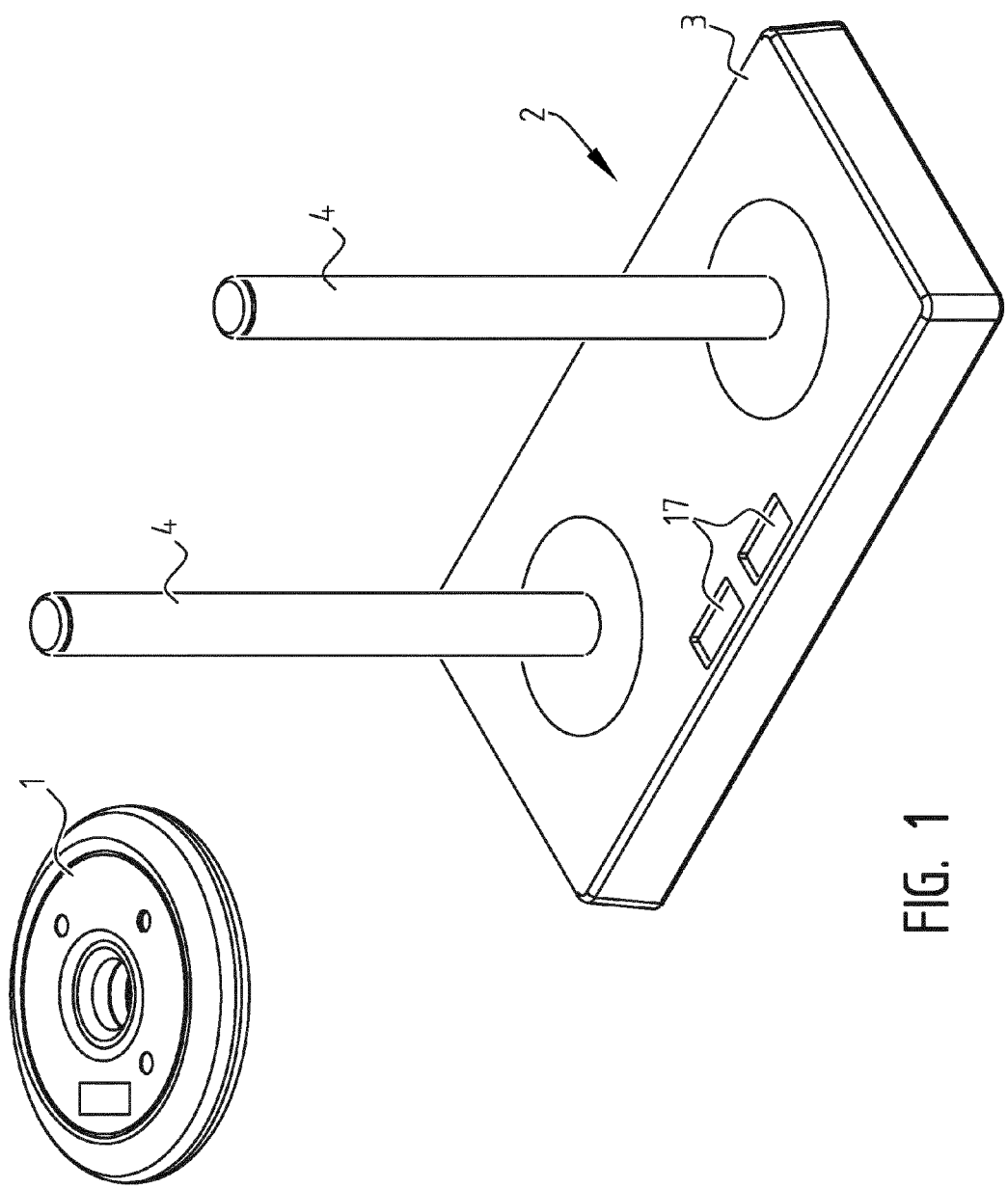
FIGS. 1 and 2 are perspective views of a table number system in accordance with the invention.
Figure 2:
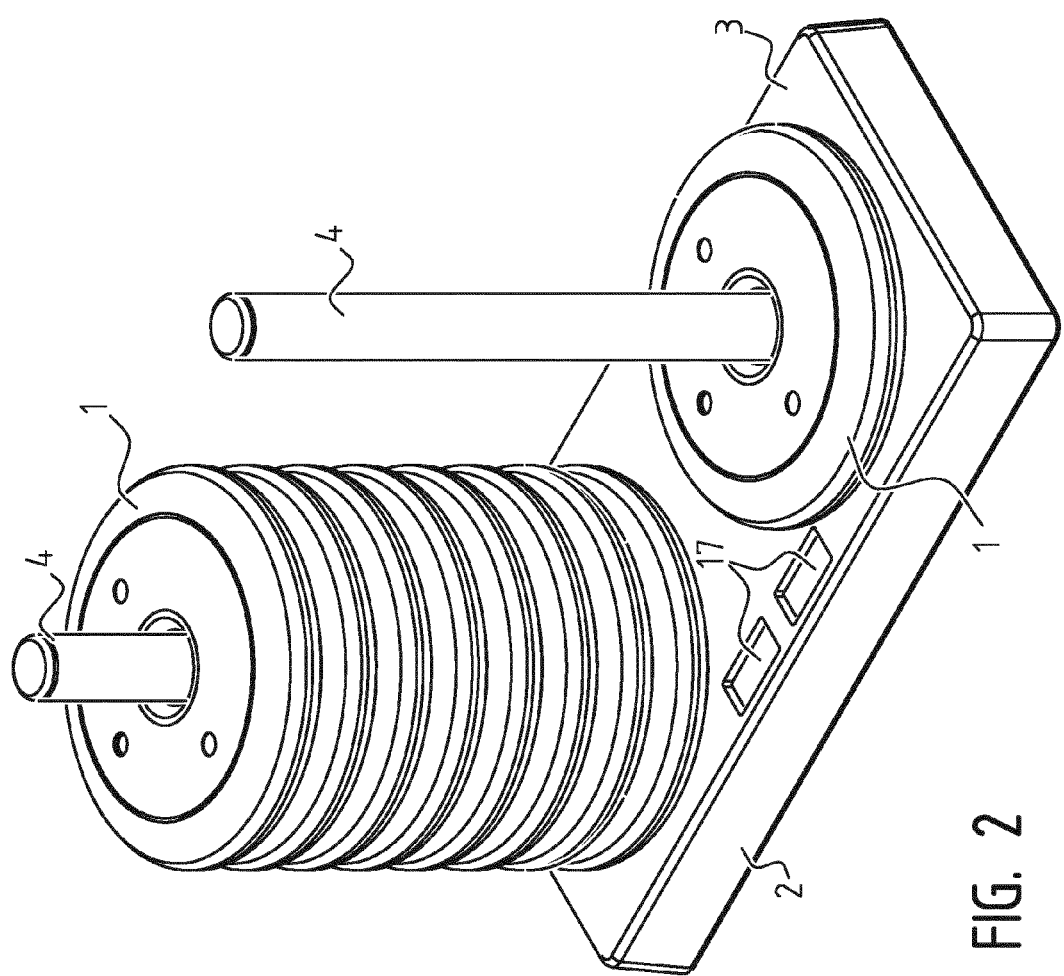

According to the figures, a table number system comprises a multitude of electronic table number devices in the form of pods 1 and a wireless charger 2. The pods 1 generally have a doughnut shape, meaning that they are ring shaped, or in an alternative definition that they are disc shaped having a central through hole. The charger 2 is comprised of housing having a flat box shaped base 3 and two cylindrical pillars 4. The diameter of the pillars 4 correspond to the diameter of the through hole in the pods 1, such that the pods 1 can be stacked on the base 3 by subsequently moving pods 1 downward on one the pillars 4. The height of each pillar 4 is such that it can hold ten pods 1.

Figure 3:
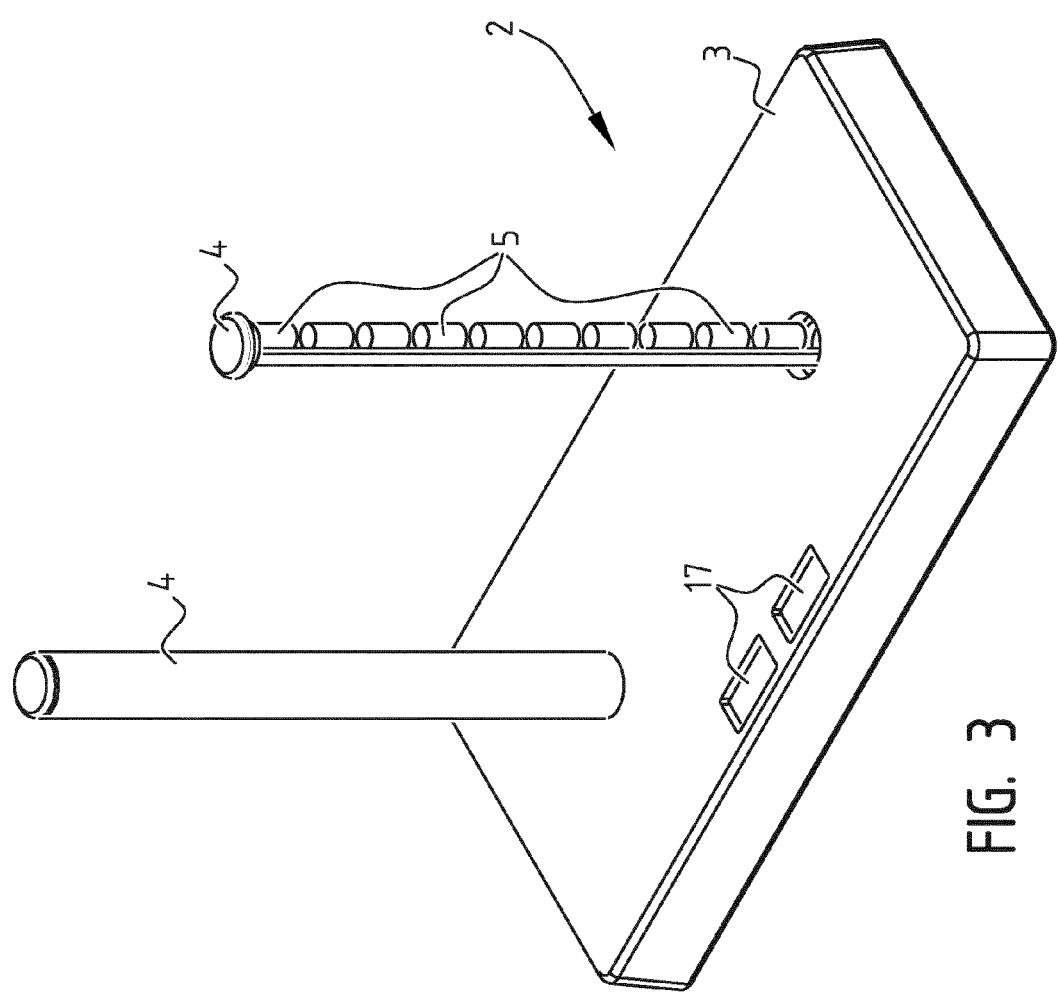
FIG. 3 is a perspective view of the wireless charger of the table number system of FIGS. 1 and 2, wherein the housing is partially opened.
Figure 4:
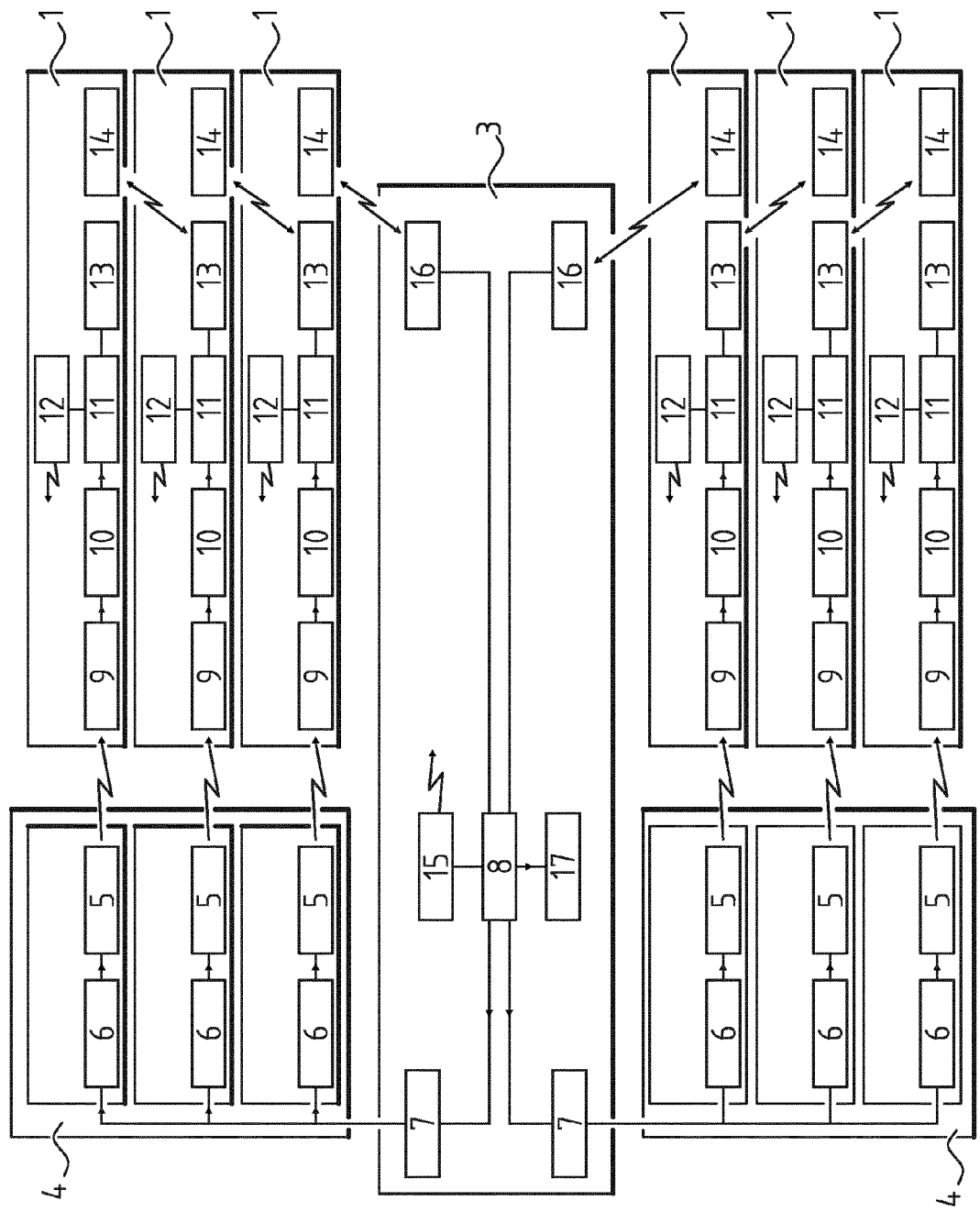
FIG. 4 is a schematic layout of the table number system of FIGS. 1 and 2.

As shown in FIG. 3, each pillar is provided with ten wireless power transmitting coils 5, equally distributed along its height. As shown in FIG. 4, each transmitting coil 5 is connected to an associated transmitter charging circuit 6, which in turn are connected to charging controls 7 and a charger processor 8, which is arranged to control the power on each individual transmitting coil 5.

Each pod 1 is provided with a wireless power receiving coil 9, which is connected to a receiver power circuit 10 comprising a rechargeable battery for powering the pod 1 when it is used as a table number device.

Tables in a restaurant are provided with a unique RFID table identifier tag, for instance in the form of a sticker on the table surface. The sticker may be provided with user instructions like "PLACE THE TABLE NUMBER HERE". A visible table number is printed on the pod 1, and user instructions may also be printed on the device.

The pod 1 comprises further comprises a processor 11 connected to said receiver power circuit 10, and a wireless radio interface 12 as well as a RFID tag detector 13 connected thereto, which can communicate data received from the RFID tag detector, for instance a detected RFID table identifier, together with its own device identifier, to wireless communication means of a computer at a central counter.

Each pod 2 is provided with an RFID pod identifier tag 15. Said wireless radio interface 12 is also arranged to communicate any RFID pod identifiers detected by the RFID detector 13, such as the RFID pod identifier of the pod 2 on top thereof, together with its own pod identifier, to a wireless radio interface 14 in the charger 2, which is connected to the charger processor 8. Also the base 3 is provided with two RFID tag detectors under the stacks of pods 2, such that also pods directly on top of the base can be detected and their RFID pod identifiers can be communicated to the charger processor 8. The charger processor 8 is arranged to determine, based on the pairs of received pod identifiers how many pods 2 are present in each of said two stacks on the pillars 4. Based on this information, the charger processor 8 powers the corresponding transmitting coils 5 for charging the pods 2 present. The charger 2 comprises indicator displays 17, which indicate the charge status of each pod 1 that is currently on the charger 2. Power is applied to the charger 2 via a connector on the back.

Power is thus transferred, from a charging cylinder 4 to a pod 1 wirelessly with no electrical connection and with the items fully isolated from each other. This allows the pod 1 to completely environmentally sealed. The charger 2 is able to detect how many pods 1 are currently on a particular charging cylinder 4 and turn on/off coils 5 in sections of the wireless power transmitter circuit in that charging cylinder 4 for each pod 1 or groups of pods, depending whether the pods 1 are present. This is used as a power saving function so sections of the wireless power transmitter are shutdown if they are not required.

In this embodiment the charger 2 has two charging cylinders 4, but the charger 2 can also be built with a single cylinder 4 or more than two cylinders 4. Also, these figures show charging cylinders 4 which can handle ten pods 1 each, however the cylinder length can be longer or shorter to handle more or less pods 1.

When a client places an order at a central counter, he or she will receive a pod 1 from one of the stacks on the charger 2 and be requested to find a table in the restaurant or café and put the pod 1 on the sticker with the RFID tag. The computer at the central counter is arranged to show the table number (actually order number) and the table identifier received from the wireless radio interface 12 of the pod 1 on the monitor or to print this on the order slip, such that the personnel know where to find the pod 1 in order to deliver the order to the client. Alternatively, the location of the table number can be shown on a map of the layout of the restaurant or café by superimposing the active—not yet serviced—table numbers (order numbers) on top of the table symbols.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:
1. A system comprising:
a plurality of electronic devices, each comprising a device housing and a rechargeable battery; and
a charger comprising a charger housing and arranged for charging said rechargeable batteries,
wherein said charger comprises at least one wireless power transmitting coil in said charger housing and said electronic devices each comprise a wireless power receiving coil in said device housing,
wherein said at least one power transmitting coil in said charger housing is provided in a pillar member along an axis,
wherein said charger housing and said device housings are configured to accommodate and hold the power receiving coils of said electronic devices in an array along said pillar member by placing said electronic devices in an array against each other and holding each power receiving coil of said electronic devices in the vicinity of at least one power transmitting coil in said pillar member, and
wherein said pillar member extends from a base member of said charger housing, the pillar member further being configured to accommodate only a single electronic device against the base member when said multitude of electronic devices are placed in a stacked configuration along said pillar member.
2. The system in accordance with claim 1, wherein said charger comprises a multitude of said wireless power transmitting coils arranged in an array along said pillar member, wherein each power receiving coil in said device housing is disposed in the vicinity of a corresponding one of said power transmitting coils in the pillar member.

3. The system in accordance with claim 1, wherein said pillar member and said through holes are cylindrical.

4. The system in accordance with claim 1, wherein said electronic devices are doughnut shaped.

5. The system in accordance with claim 1, wherein said charger is provided with detection means arranged to detect the number of electronic devices present, and with charging control means arranged to power the power transmitting coils corresponding to said detected number.

6. The system in accordance with claim 5, wherein said detection means comprise an RFID tag reader in said charger housing and RFID tags on or in said device housing.

7. The system in accordance with claim 5, wherein said detection means further comprise an RFID tag reader in each of said device housings and wireless communication means for communicating RFID tag information to said charger.

8. The system in accordance with claim 1, wherein each electronic device has a height which is smaller than its depth and width, and said at least one power transmitting coil and said power receiving coil are arranged in their respective housings to transmit the maximum amount of power if said electronic devices are arranged in said array with their height direction in the same direction as said pillar member.

9. The system in accordance with claim 1, wherein each electronic device is a table number device.

\* \* \* \* \*